March 10, 1964  F. R. BECK ETAL  3,124,271
TIMER CONTROLLED PRESSURE OPERATED DISPENSER
Filed Sept. 27, 1960  2 Sheets-Sheet 1
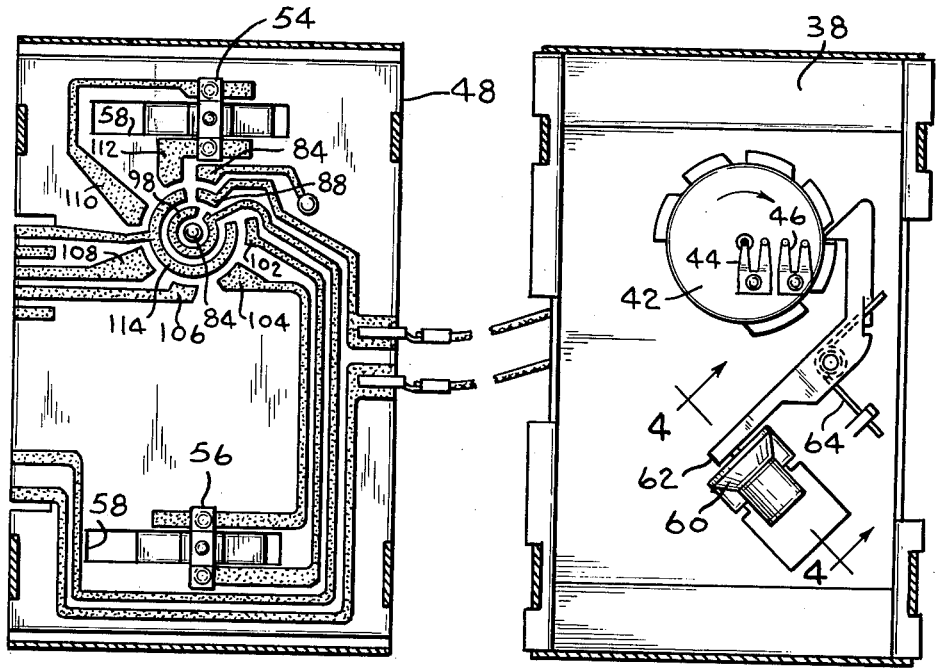
FIG. 2    FIG. 3
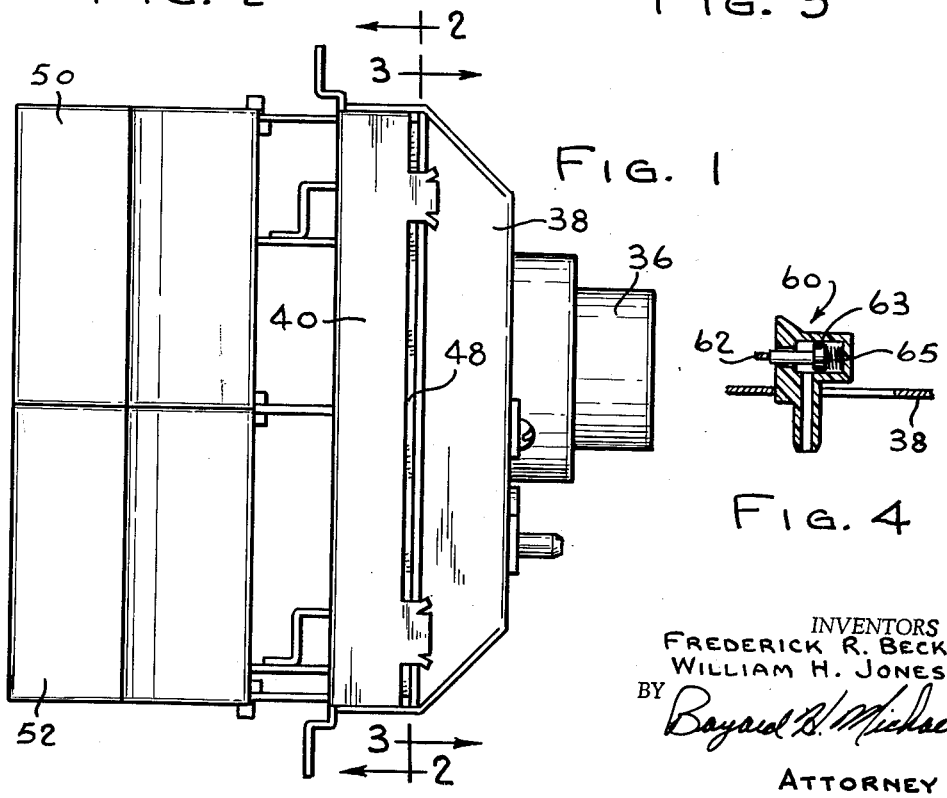
FIG. 1
FIG. 4
INVENTORS
FREDERICK R. BECK
WILLIAM H. JONES
BY
Bayard H. Michael
ATTORNEY March 10, 1964    F. R. BECK ETAL    3,124,271
TIMER CONTROLLED PRESSURE OPERATED DISPENSER
Filed Sept. 27, 1960    2 Sheets-Sheet 2

INVENTOR.
FREDERICK R. BECK
WILLIAM H. JONES
BY
ATTORNEY

United States Patent Office 3,124,271
Patented Mar. 10, 1964

3,124,271
TIMER CONTROLLED PRESSURE
OPERATED DISPENSER
Frederick R. Beck, Maywood, and William H. Jones, Villa Park, Ill., assignors to Controls Company of America, Schiller Park, Ill., a corporation of Delaware
Filed Sept. 27, 1960, Ser. No. 58,839
13 Claims. (Cl. 222—70)

This invention relates to a liquid dispensing system for automatic washing machines, and particularly to a selector control system for dispensing variable quantities of different liquids during different periods in the cycles of operation.

Automatic washing machines are now being manufactured which are capable of dispensing liquid detergent, rinse conditioner and bleach during the operating cycles. In the more refined type machines, the circuitry for the main sequence timer has become so complicated that it is difficult to design a system which can be readily integrated into the main timer.

The primary object of this invention is to provide a dispensing control for an automatic washing machine.

This system contemplates the addition of a second timer system to a sequence timer for a washing machine to control the electrical pulses to a pumping means to intermittently dispense from one of a number of liquid reservoirs. The duration of each pulse of the pump is mechanically controlled by the second timer to dispense a predetermined amount of liquid from one of the reservoirs each time the pump is pulsed. By controlling the number of pulses to the pump, the exact amount of liquid which is dispensed can be determined. The reservoirs are actuated through a distributor means connected to the pump and mechanically controlled by the sequence timer so that only the reservoir which is actuated by the sequence timer will dispense liquid during any particular period of the cycle.

Other objects and advantages will be pointed out in, or be apparent from, the specification and claims, as will obvious modifications of the single embodiment shown in the drawings, in which:

FIG. 1 is a side elevation of the dispenser timer control;

FIG. 2 is taken on line 2—2 of FIG. 1 showing the printed circuit board arrangement;

FIG. 3 is taken on line 3—3 of FIG. 1 showing the cam operated vent valve for the air pump;

FIG. 4 is taken on line 4—4 of FIG. 3 showing the vent valve arrangement;

Figure 6:
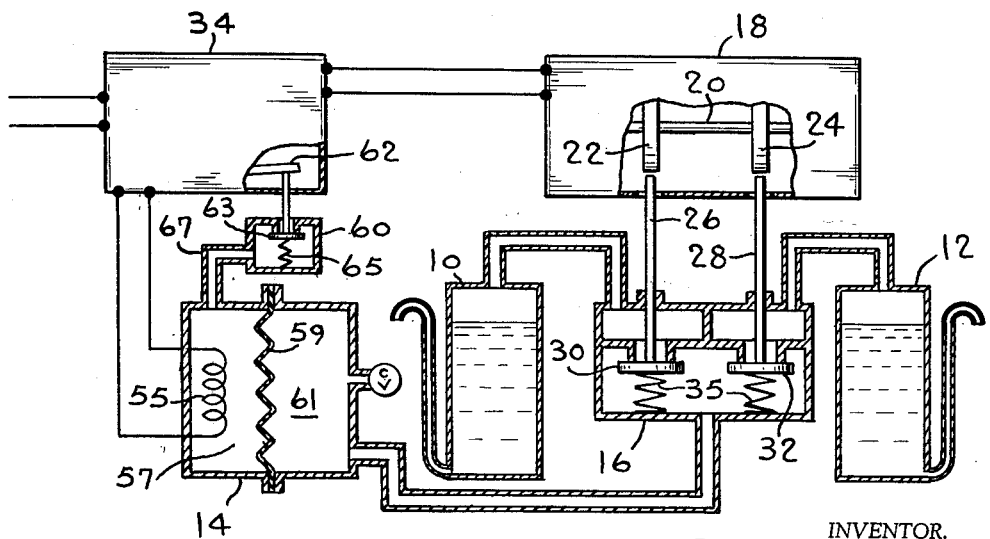
FIG. 6 is a schematic view of the whole dispensing system.

Referring now to the drawings in detail, particularly FIG. 6, the dispenser system includes a pair of reservoirs 10, 12 for retaining liquids such as detergents, rinse conditioners or bleach which are pressure actuated by diaphragm pump 14 through distributor valve 16. A sequence timer 18 having a switch actuating cam bank 20 is positioned with cams 22 and 24 operatively engaging valve stems 26, 28 or valves 30, 32 biased to a closed position by springs 35. During the step-by-step motion of the sequence timer, the valves are individually, or simultaneously if desired, opened for a number of steps during certain portions of the cycles to activate the corresponding reservoir of liquid which will then be dispensed when the pump is pulsed. Simultaneous with the opening of one of the valves, the sequence timer energizes dispenser timer 34 which controls the pulsing of the diaphragm pump and the duration of the pulses.

The diaphragm pump is pulsed by energizing heater 55 which builds up pressure in chamber 57 expanding diaphragm 59. The pressure which is built-up in chamber 61 is communicated through the distributor valve to the reservoirs. The time interval of the pressure pulses from the pump to the reservoir determines the quantity of liquid which is dispensed during each pulse of the pump. This interval is regulated by vent valve 60 controlled by cam follower 62 pivoted on the cover and biased by spring 64 into engagement with peripheral cam surface 66 on cam disc 42. The valve is connected to the pressure side 57 of the diaphragm pump and includes a piston 63 biased by spring 65 to close line 67 to the pump. The piston is actuated by the cam follower 62 to open the line to the pump when the pressure built-up in the pump has been sufficient to dispense a predetermined amount of liquid from one of the reservoirs. The peripheral cam surface shown in FIG. 3 will open the vent valve six times during each cycle of operation of the dispenser timer, which corresponds with the number of selectable conditions available with this timer. The peripheral surface may be varied to provide any number of valve openings in accordance with the number of selectable conditions which are available on the timer. The number of valve openings does not indicate the number of impulses of the pump as described hereinafter The dispenser timer includes a timer motor 36 mounted on cover 38 of housing 40 which drives a cam disc 42 to wipe brushes 44 and 46 across the surface of printed circuit board 48. Rocker type selector switches 50, 52 are rotatably mounted on housing 40 to selectively position switches 54, 56 slidably positioned in slots 58 in the circuit board. Heater 55 in the diaphragm pump is connected to the circuit board so that the position of the switch with respect to the board will determine the number of times the heater will be energized for each cycle of operation of the dispenser timer.

Figure 5:
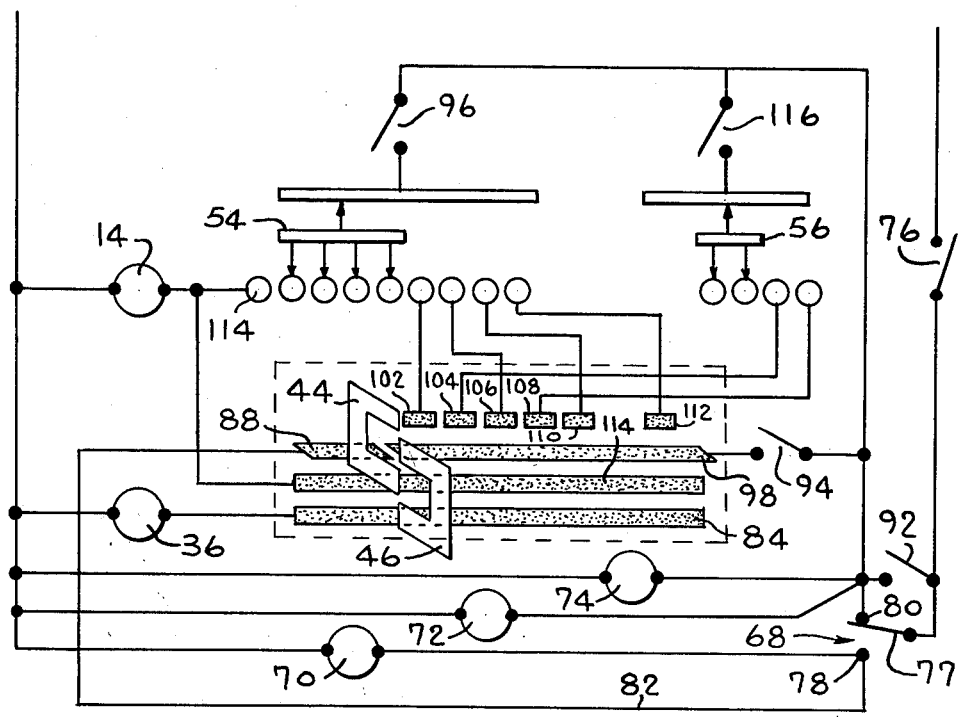
FIG. 5 shows the electrical circuit arrangement for the system with a linear view of the printed circuit board.

A linear representation of the circuit board is shown in the circuit diagram (FIG. 5) to simplify the description of the operation of the circuit for the dispenser system. A conventional washing machine circuit is shown schematically and is connected to the dispenser timer circuit and includes pressure switch 68, water fill valve 70, main motor 72 and sequence timer motor 74. In the normal operation of a washing machine, line switch 76 is closed and the machine filled with water until pressure switch blade 77 moves from the "empty" switch contact 78 to the "full" switch contact 80. The "empty" switch contact is connected through line 82 to printed circuit 84. If brush 46 has been stopped in contact with circuit 88, a complete circuit will exist across the brush through circuit 84 to energize dispenser motor 36 moving the brushes to the right until the brush leaves circuit 88. When the machine is filled, the pressure switch blade will open switch contact 78 and close with switch contact 80, energizing the main motor 72 and the sequence timer motor 74. In the first step of the washing cycle, switches 94 and 96 will be closed and valve 30 will be opened by the sequence timer. Printed circuit 98 will now be energized and since brush 46 has been moved into contact with circuit 98 during the filling period, the dispenser timer motor will be energized.

Brush 44 will now be wiped across circuits 102, 104, 106, 108, 110 and 112. If selector switch 54 is moved to the right so that it contacts circuit 102, the heater 55 will be energized when brush 44 engages the circuit. A single impulse will then be transmitted to the active reservoir. This will normally be the detergent reservoir and circuits 102, 106, 110 and 112 are connected to the detergent selector switch to provide a maximum of eight ounces of detergent during the washing cycle. When brush 46 moves beyond the end of circuit 98, the dispenser timer will stop and switches 94 and 96 will be opened by the sequence timer. Switch 92 will be closed during the portions of the cycle when the pressure switch is on "empty" and the main motor and sequence timer are to be operated. During the rinsing portion of the washing cycle, switches 94 and 116 will be closed and valve 32 opened by the sequence timer. Since the machine is normally emptied after a wash cycle, the pressure switch blade will close with the "empty" switch contact completing the circuit to the printed circuit 83. The dispenser timer motor 36 will again be energized advancing the brushes to a starting position in contact with circuit 98. When the machine is filled for the rinse cycle, the pressure switch will close with contact 80 energizing the sequence timer motor and the dispenser timer motor through circuit 98, brush 46 and circuit 84. The dispenser timer motor will wipe brush 44 across circuits 104 and 108 connected to the selector switch 56 energizing heater 55 once or twice, depending on the position of the switch.

The quantity of liquid which is dispensed during any period in the cycle of operation can be varied either by changing the timing on the vent valve to increase or decrease the amount dispensed during each impulse, or the number of pulses can be increased or decreased. In the present arrangement, the air pump could be pulsed six times during each cycle of operation. Manual dispensing of liquid detergent can be accomplished during a washing cycle when switch 96 is closed by moving selector switch 54 to the left completing a circuit through contact 114 to diaphragm pump 14. A predetermined amount of detergent will be added each time the selector switch is depressed.

Accurate control of the dispensing of liquids during a sequence of operations is assured with the above system, since the main timer positively controls the distributor valve for the reservoirs and the dispenser timer. The quantity of liquid dispensed is also accurately controlled by the dispenser timer which coordinates the pressurizing of the system with the means for depressurizing the system so that a predetermined amount of liquid will be dispensed each time the system is pressurized. The total quantity which is dispensed during any one cycle of the dispenser timer is dependent on the number of times that the system is pressurized. Another feature of this system is that the dispenser timer can be cycled only once each time the machine is filled with water since the pressure switch must indicate that the machine is "empty" before the dispenser can move to the starting point of a cycle. This timing arrangement therefore requires a certain sequence of operations to occur before any dispensing will occur. Manual dispensing also increases the versatility of the machine, by making it possible to provide sufficient detergent to meet a particular need.

Although but a single embodiment of the present invention has been illustrated and described, it will be apparent to those skilled in the art that various changes and modifications may be made therein without departing from the spirit of the invention or from the scope of the appended claims.

We claim:

1. In a washing machine, a liquid dispensing system comprising, a first timer, a number of liquid reservoirs, pressure distributor means connected to said liquid reservoirs for separately activating said reservoirs, means operatively connecting said pressure distributor means to and for control by said first timer so that said reservoirs are activated during predetermined periods of the timer operation, a second timer energized by the first timer during said predetermined periods, and pump means connected to the pressure distributor and controlled by the second timer to pressurize the distributor according to a preselected sequence of operations.

2. In the combination of claim 1 wherein said second timer includes a timing motor, a disc driven by the timing motor at timing speed, a first circuit element carried by the disc, second circuit elements fixed against movement and positioned to be contacted by the first circuit element, means adapted to connect said first and second circuit elements to an electrical source, selection switches in circuit with one of the circuit elements to establish a closed circuit condition, said pump means being actuated once each time a closed circuit is contacted by the first circuit element.

3. In the combination of claim 2 including means for limiting the duration of actuation of the pump means whereby a predetermined quantity of liquid is dispensed each time the pump means is actuated.

4. A liquid dispensing system for a washing machine having an interval timer driven by a timer motor through a preselected sequence of operations comprising, reservoir means for retaining the liquids to be dispensed, pressure distributor means connected to said reservoir means and operative to separately pressurize said reservoir means, means connecting said pressure distributor means to and for control by the interval timer for separately pressurizing the reservoir means during different intervals in the sequence of operation, and dispenser timing means operatively connected to the pressure distributor means to energize the pressure distributor means a preselected number of times during the intervals when the pressure distributor means is activated.

5. A system according to claim 4 including means connecting said dispenser timing means to and for control by the interval timer.

6. A liquid dispensing system according to claim 4 wherein said dispenser timer means includes means for limiting the duration of energization of the pressure distributor means whereby a predetermined quantity of liquid is dispensed each time the pressure distributor means is energized.

7. A liquid dispenser system according to claim 6 wherein the pressure distributor means includes a distributor valve mechanically actuated by the interval timer during different portions of the sequence of operation.

8. A liquid dispenser according to claim 7 wherein the pressure distributor means includes an electrically energized pump means electrically impulsed by the dispenser timing means according to a preselected cycle of operations, and a vent means on the pump means controlled by dispenser timing means for limiting the duration of each impulse.

9. A liquid dispenser according to claim 8 including a water level switch responsive to the water level in the washing machine, a circuit including the interval timer and the dispenser timer and the level switch, the dispenser timer means being dependent upon the proper interval in the sequence of operation of the interval timer and a predetermined water level in the washing machine.

10. A system for automatically dispensing one of a number of liquids into a washing machine comprising, a sequence timer having a switch operating cam bank to control the sequence of operation, a number of reservoirs for retaining the liquids to be dispensed, distributor means for actuating the reservoirs and including valve means actuated by the cams in the cam bank, pump means connected to the distributor for pressurizing the reservoir activated by the distributor, and timing means connected to the pump means to energize the pump means so that predetermined quantities of liquid are dispensed each time the pump means is energized.

11. A system according to claim 10 including means connecting said timing means to and for control by the switches operated by the cam bank and also includes means connecting the valve means to and for control by the cams in the bank which actuate the switches controlling the timing means.

12. Apparatus for a washing machine liquid dispensing system comprising, in combination, a timing motor, a disk driven by said timing motor at a timing speed, a first electrical circuit member carried by said disk, second electrical circuit members fixed against movement and positioned to be contacted by said first member, selection switches in circuit with said second members to establish a predetermined number of closed circuit conditions of the second members, dispensing means actuated once each time said first circuit member connects with one of said second members having a closed circuit condition, and means for limiting the duration of the actuating impulse to the dispensing means whereby a predetermined quantity of liquid is dispensed each time the dispensing means is impulsed, said limiting means comprising a peripheral cam surface on said disk and pressure relief means actuated by the cam surface each time the first circuit member engages one of the second circuit members.

13. The combination of claim 12 including a switch responsive to a control condition and a circuit including the timing motor and the switch whereby the timing motor is operative only when the switch responds to the control condition.

References Cited in the file of this patent

UNITED STATES PATENTS

| | | |
|---|---|---|
| 1,958,541 | Hutchings | May 15, 1934 |
| 2,118,704 | Grontkowski | May 24, 1938 |
| 2,137,928 | Tanqueray | Nov. 22, 1938 |
| 2,254,269 | Clark et al. | Sept. 2, 1941 |
| 2,558,522 | Knapp | June 26, 1951 |
| 2,867,224 | Martiniak et al. | Jan. 6, 1959 |
| 2,966,278 | Drury | Dec. 27, 1960 |
| 3,045,874 | Kogan et al. | July 24, 1962 |
| 3,074,596 | Marchi | Jan. 26, 1963 |

UNITED STATES PATENT OFFICE
CERTIFICATE OF CORRECTION

Patent No. 3,124,271                                                March 10, 1964

Frederick R. Beck et al.

It is hereby certified that error appears in the above numbered patent requiring correction and that the said Letters Patent should read as corrected below.

Column 4, line 59, for "actuating" read -- activating --.

Signed and sealed this 28th day of July 1964.

(SEAL)

Attest:

ESTON G. JOHNSON                                          EDWARD J. BRENNER
Attesting Officer                                               Commissioner of Patents